July 24, 1956  F. E. ALTMAN  2,755,701

DISTORTIONLESS ZOOM VIEWFINDER FOR CAMERAS

Filed May 2, 1955

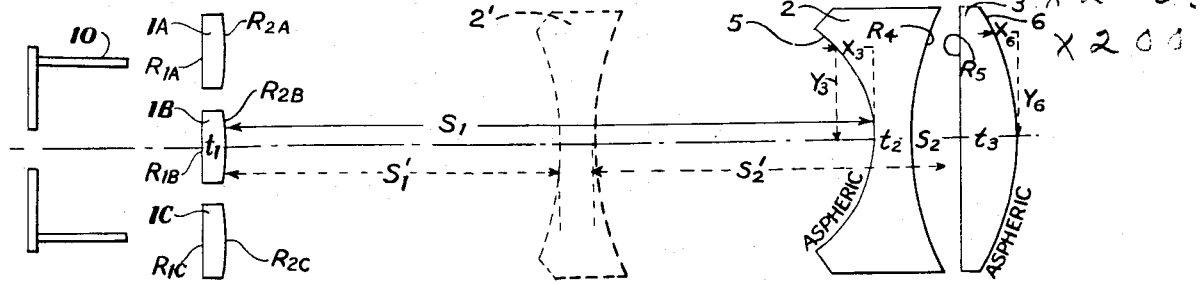

Fig. 1

| ALL LENSES: PLASTIC, $N_D = 1.490$, $V = 60.5$ | | | |
|---|---|---|---|
| LENS | EF | CURVES | THICKNESSES |
| 1A | 82. mm. | $R_{1A} = \infty$<br>$R_{2A} = -40.2$ mm. | $t_{1A} = 1.5$ mm. |
| 1B | 91. | $R_{1B} = \infty$<br>$R_{2B} = -44.6$ | $t_{1B} = 1.5$ |
| 1C | 102. | $R_{1C} = \infty$<br>$R_{2C} = -50.0$ | $t_{1C} = 1.5$<br>$S_1 = 72$<br>$S_1' = 42$ |
| 2 | -16.6 | $X_3 = .05259Y^2 - .000043Y^4$<br>$R_4 = +60.0$ | $t_2 = 2.0$<br>$S_2 = 31$<br>$S_2' = 1.$ |
| 3 | +71.7 | $R_5 = \infty$<br>$X_6 = -.014225Y^2$ | $t_3 = 3.5$ |

Fig. 2

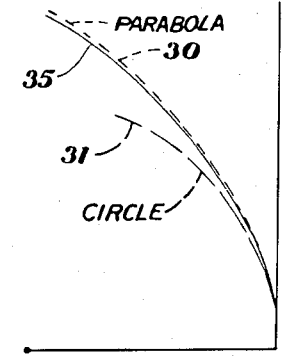

Fig. 3

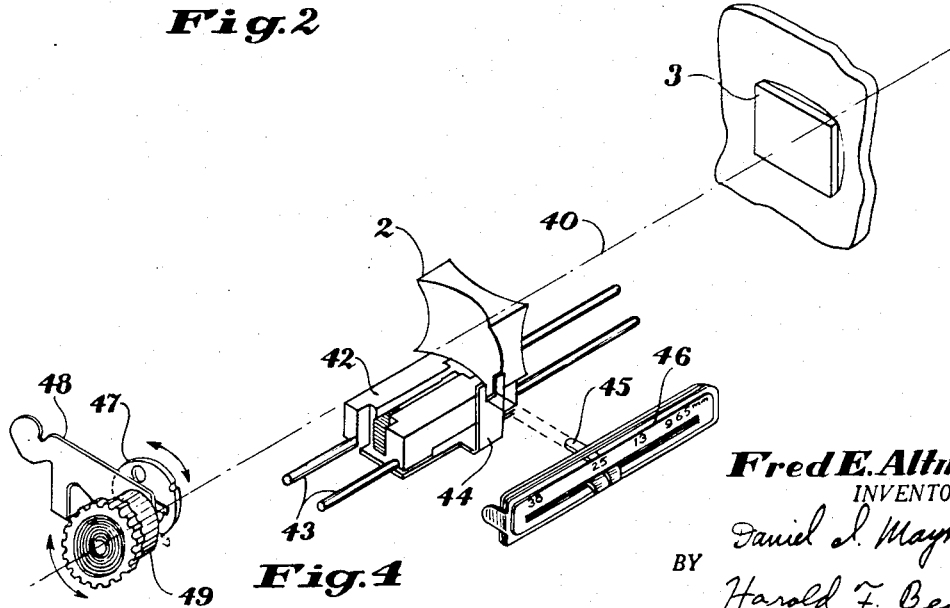

Fig. 4

Fred E. Altman
INVENTOR.

BY Daniel L. Mayne
Harold F. Bennett
ATTORNEY & AGENT

2,755,701

DISTORTIONLESS ZOOM VIEWFINDER FOR CAMERAS

Fred E. Altman, Rochester, N. Y., assignor to Eastman Kodak Company, Rochester, N. Y., a corporation of New Jersey Application May 2, 1955, Serial No. 505,452

1 Claim. (Cl. 88—1.5)

This invention relates to direct viewfinders of the reversed Galilean telescope type and particularly to zoom viewfinders, that is viewfinders in which the magnification is changeable for matching taking lenses of different focal lengths.

The object of the invention is to provide a zoom viewfinder which is substantially corrected for distortion at all magnifications throughout the zooming range.

Optical zoom systems, that is systems in which the magnification of the system is changeable while the conjugate distances remain substantially fixed, are well known. The paraxial theory of such systems is known, and shows that two lenses must be moved differentially to keep a fixed focal plane but that when a certain amount of movement of the image plane can be tolerated, it is sufficient to move only one lens element. Usually it is easy to compute a system which will give a predetermined range of magnifications and to determine whether the movement of the image plane is within tolerances or whether a second movable lens element is required. The aberrations of zoom systems are very difficult to correct, however, since a ray from a given object point traverses different zones of the lens elements at different stages of zooming.

Zoom viewfinders for use on cameras having interchangeable or zoom objectives are known and are generally of the reversed Galilean type consisting of an objective of negative power in front and an eyepiece of positive power spaced therebehind. The objective is made up in at least two parts or members the spacing between which is variable for changing the focal length of the objective and hence the magnification of the system. Preferably the front member is positive in power, and the rear member facing the eyepiece is negative and movable. In this way, as the focal length of the objective varies so also the distance between the rear nodal point thereof and the front nodal point of the eye piece changes in the right direction to tend to maintain a fixed final image distance. If, however, the image distance is found to vary more than tolerable, then either the front member of the objective can be made movable or the eyepiece can be refocused to maintain the image distance constant.

Reversed Galilean finders tend to suffer rather seriously from barrel distortion. While this has been corrected by known means at a fixed magnification, no means of correcting the distortion of a zoom system throughout the zooming range has heretofore been known.

According to the present invention, a distortionless zoom viewfinder of the reversed Galilean type comprises a negative objective and a positive eyepiece approximately afocally spaced therebehind, in which the objective comprises a front positive element and a rear biconcave element mounted for axial movement between the front element and the eyepiece for changing the magnification, characterized by the front positive element having a convex front surface substantially parabolic in axial section and by the biconcave element having its rear surface from four to ten times as strongly curved at the vertex as its front surface and having its rear surface aspheric and defined by an equation $$X = AY^2 + BY^4 + CY^6 + \ldots$$

in which X and Y are the coordinates of a point on the surface, A is one-half the curvature of the surface at the vertex, B is between zero and $0.2 A^3$, and the algebraic sum of all higher order terms is numerically less than $BY^4$ at the maximum value of Y. The maximum value of Y is, of course, one-half the maximum diameter of the clear aperture of the lens.

Conveniently, $CY^6$ and all higher order terms are zero. Also the curvature of the rear surface of the front element should be numerically less than one-tenth that of the front surface and may be zero, i. e. plane.

The eyepiece is or may be a simple positive element substantially the same as in the prior art, and preferably a series of such lenses of different focal lengths are mounted for use selectively for focusing.

I have discovered that the distortion is substantially corrected (leaving a small residual of barrel distortion, which is considered desirable) at all magnifications by making the two surfaces aspheric as above defined in a finder designed for use on an amateur type movie camera having interchangeable lenses ranging from 6.5 mm. to 38 mm. in focal length—a range of 6 to 1.

In the accompanying drawing:

Fig. 1 shows in diagrammatic axial section a zoom viewfinder according to the invention with interchangeable eyepieces.

Fig. 2 gives constructional data for a specific example thereof.

Fig. 3 is a graph showing the curve of one of the aspheric surfaces according to the invention.

Fig. 4 is a perspective view of a zoom finder according to the invention.

Fig. 1 is a zoom viewfinder according to the invention comprising a two-element objective 2, 3 and an eyepiece 1B.

The objective comprises a front plano-convex element 3 and a rear biconcave element 2, the latter being slideably mounted by mounting means such as those shown in Fig. 4 so as to slide from the position shown in full near the front element 3 to the position 2' shown in broken lines and being maintained coaxial with the front element throughout this range.

The eyepiece 1B is one of a plurality of interchangeable eyepieces 1A, 1B, 1C shown schematically. These are mounted by mounting means (such as a turret, see Fig. 4) so that they can be selectively aligned with the objective. This series of eyelenses differ in power in steps of about 1D to 1.3D and serve a double purpose, first to provide a comfortable viewing distance for different users at any one setting of the zoom element 2 and second to provide an adjustment of the viewing distance to accommodate for the effect of the movement of the zoom element 2. This arrangement takes advantage of the power of the normal eye to accommodate about one diopter and thereby simplifies the construction. Turret mountings for lenses are well known, one being shown, for example, in U. S. 409,927, Clements. The three eyelenses may conveniently be molded as one piece of plastic and masked by an opaque layer of lacquer or thin metal. Conveniently, the eyepiece tube 10 is geared to the turret so that the eyelenses can be changed by rotating the eyepiece tube.

Fig. 2 is a table giving constructional data for one specific viewfinder system according to Fig. 1. All lens elments are molded of plastic, the mean refractive index $N_D$ being 1.490 and the dispersive index V being 60.5. In the body of the table the lens elements are numbered in the first column the same as in Fig. 1. The second column gives the focal length of each element. The third column gives the radii of curvature R of the spherical surfaces and the equations defining the aspheric surfaces 5 and 6, the subscripts identifying the surfaces as numbered from the eyepiece through the objective. Finally, the last column gives the thicknesses $t$ of the lens elements, the spaces $s$ for the finder when adjusted for use with a 6.5 mm. taking lens and the spaces $s'$ for use with a 38 mm. lens. This table is repeated here for convenience.

| Lens | EF, millimeters | Curves | Millimeters |
|---|---|---|---|
| 1A | 82 | $R_{1A}=\infty$<br>$R_{2A}=-40.2$ mm. | $t_{1A}=1.5$ |
| 1B | 91 | $R_{1B}=\infty$<br>$R_{2B}=-44.6$ | $t_{1B}=1.5$ |
| 1C | 102 | $R_{1C}=\infty$<br>$R_{2C}=-50.0$ | $t_{1C}=1.5$ |
| 2 | −16.6 | $X_3=-.05259Y^2-.0000143Y^4$<br>$R_4=+60.0$ | $s_1=72$<br>$s'_1=42$<br>$t_2=2.0$<br>$s_2=31$<br>$s'_2=1$ |
| 3 | +71.7 | $R_5=\infty$<br>$X_6=-.014225Y^2$ | $t_3=3.5$ |

As mentioned before, N=1.49 and V=60.5 in all lens elements.

Fig. 3 is a diagram showing the curve 35 of the aspheric surface 5 several times enlarged and compared with a circular arc 31 and a parabolic arc 30, all of these curves osculating at the vertex. It may be seen that the curve as shown has about 1/10 as much curvature of orders higher than the second as the circular arc has, that is to say, it departs from the parabola about 1/10 as much as the circular arc does. What amounts to the same thing, the coefficient of $Y^4$ as given in the table is .0000143 and this is between zero and 0.2 $(.05259)^3$ or between 0.0 and .0000290 in accordance with the invention. The coefficients of powers of Y higher than the fourth are zero in this example.

This finder has been made up and found to have no noticeable distortion at any part of the zooming range.

Fig. 4 is a partly exploded schematic perspective view showing one practical method of mounting the optical parts of the finder. The positive lens 3 of the objective is mounted in the casing of the camera or an extension thereof, a portion of which is shown in phantom view. The biconcave lens 2 of the objective is mounted on a slide 42 by a conventional mounting frame, not shown, or preferably by being molded integrally therewith, and is moved along the axis 40 when the latter is slid along the guide rails 43. The slide 42 is provided with a clip 44 which holds it on the rails and also engages with the index tab 45 when the instrument is assembled, so that the finder can conveniently be adjusted to suit the focal length of the taking lens by moving the index tab to the appropriate point along the scale 46.

The eyelenses are molded integrally in a disc 47 and a small pinion gear (concealed by the eyetube 49) is also molded integral therewith and a hole provided for mounting it on an axis of rotation. The gear meshes with a gear attached to the eyetube 49, and a guide 48 holds the lens disc in position and carries a spring detent (not shown) for engaging notches in the edge of the disc for holding the disc in one of the operative positions. Thus the turret disc 47 is turned by turning the eyetube 49, and the whole instrument is enclosed in a case with only the eyetube, the focal length scale and the front lens showing.

I claim:

A zoom viewfinder for a camera, comprising a negative objective and a positive eyepiece axially aligned and approximately afocally spaced therebehind, in which the objective comprises a front positive plano-convex element and a rear biconcave element mounted for axial movement between the front element and the eyepiece for changing the magnification, characterized by the front positive element having a convex front surface substantially parabolic in axial section and by the biconcave element having its rear surface from four to ten times as strongly curved at the vertex as its front surface and having its rear surface aspheric and defined by an equation $$X = AY^2 + BY^4 + CY^6 + \ldots$$

in which X and Y are the coordinates of a point on the surface, A is one-half the curvature of the surface at the vertex, B is between zero and 0.2 $A^3$, and the algebraic sum of all higher order terms is numerically less than $BY^4$ at the maximum value of Y.

No references cited.